United States Patent

Kraus, Jr. et al.

[11] Patent Number: 5,834,625
[45] Date of Patent: Nov. 10, 1998

[54] APPARATUS AND METHOD FOR DEBUBBLING A DISCRETE SAMPLE OF LIQUID

[75] Inventors: Robert Peter Kraus, Jr., Rochester; Stephen Karl Clyde, Clifton Springs, both of N.Y.

[73] Assignee: Eastman Kodak Company, Rochester, N.Y.

[21] Appl. No.: 701,109

[22] Filed: Aug. 21, 1996

[51] Int. Cl.⁶ .................................................. G01N 9/00
[52] U.S. Cl. ........................ 73/32 R; 95/30; 95/241; 96/175
[58] Field of Search ................... 73/32 R, 863; 95/30, 241; 96/175

[56] References Cited

U.S. PATENT DOCUMENTS

| | | | |
|---|---|---|---|
| 2,363,247 | 11/1944 | Holder | 95/30 |
| 3,103,424 | 9/1963 | Hosking | 55/15 |
| 3,239,998 | 3/1966 | Carter et al. | 55/159 |
| 3,429,743 | 2/1969 | Branson | 134/1 |
| 3,456,488 | 7/1969 | Ayres | 73/1 |
| 3,461,651 | 8/1969 | VanIngen | 55/199 |
| 3,591,946 | 7/1971 | Loe | 55/189 |
| 3,793,805 | 2/1974 | Hoffman . | |
| 3,904,392 | 9/1975 | VanIngen et al. | 55/15 |
| 4,070,167 | 1/1978 | Barbee et al. | 55/192 |
| 4,127,394 | 11/1978 | Verhille | 55/15 |
| 4,205,966 | 6/1980 | Horikawa | 55/15 |
| 4,398,925 | 8/1983 | Trinh et al. | 55/15 |
| 4,478,072 | 10/1984 | Brown | 73/61 R |
| 4,612,018 | 9/1986 | Tsuboi et al. | 55/15 |
| 4,935,151 | 6/1990 | Do | 210/739 |
| 5,022,899 | 6/1991 | Hohlfeld et al. | 55/227 |
| 5,372,634 | 12/1994 | Monahan | 96/175 |

FOREIGN PATENT DOCUMENTS

| | | | |
|---|---|---|---|
| 81112 | 7/1981 | Japan | 95/30 |
| 57-19009 | 2/1982 | Japan . | |
| 72871 | 2/1984 | Japan | 95/175 |
| 62-1413 (A) | 1/1987 | Japan . | |
| 63-264107 | 1/1988 | Japan . | |
| 5-137904(A) | 6/1993 | Japan . | |
| 1708383 | 1/1991 | U.S.S.R. | 96/175 |
| 695560 | 8/1953 | United Kingdom . | |

*Primary Examiner*—Hezron E. Williams
*Assistant Examiner*—Nashmiya S. Fayyaz
*Attorney, Agent, or Firm*—Susan L. Parulski

[57] ABSTRACT

Apparatus and method for removing bubbles from a discrete sample of a temperature-sensitive liquid, particularly a photographic emulsion. A container having a bottom and side walls defines a sample area containing the liquid to be sampled and is made of a substantially acoustically transparent material. The container is removably mounted to a receptacle such that the bottom and at least a portion of the side walls are immersed in a fluid bath. The fluid bath is heated to maintain the liquid at a predetermined temperature greater than ambient temperature. An ultrasonic device spaced from the container directs ultrasonic waves through the fluid toward the bottom of the container to degas the liquid.

12 Claims, 1 Drawing Sheet

APPARATUS AND METHOD FOR DEBUBBLING A DISCRETE SAMPLE OF LIQUID

FIELD OF THE INVENTION

The invention relates to an apparatus and method for reducing or removing bubbles from a liquid. More particularly, the invention relates to an apparatus and method for eliminating bubbles in a photographic emulsion.

BACKGROUND OF THE INVENTION

Methods are known for reducing or removing entrained air or air bubbles (e.g., degassing) from a liquid in an in-line manufacturing process. U.S. Pat. Nos. 3,904,392 and 4,070,167, commonly assigned, relate to such debubbling apparatus wherein air bubbles are being removed from a large quantity of moving liquid. Such methods are not suited for a discrete sample of liquid wherein only a small quantity of liquid needs to be debubbled, and the liquid is not moving along a flow path.

One method to reduce or remove air bubbles from a discrete sample of liquid is to let the air bubbles rise out naturally through buoyant forces over time. However, such a method can be time consuming, particularly with highly viscous liquids. Further, air bubbles may remain in the liquid, causing an inaccurate or variable reading.

U.S. Pat No. 3,103,424 by Hosking, relates to a liquid degassing means and method which employs an ultrasonic transducer unit. A water curtain is discharged between a side of the container holding the liquid and the ultrasonic transducer unit. The ultrasonic transducer unit is in contact solely with the water curtain, whereby vibrations reduce the bubbles in the liquid.

JP-57-19009 teaches a process for eliminating bubbles wherein a conveyor moves bottles filled with liquid. The bottom of the bottle is submerged in a dipping solution in a tank, and an ultrasonic vibrator is provided at the bottom of the tank to irradiate ultrasonic waves against the bottle.

While such apparatus and methods may have achieved a certain level of success, they do not ensure that all air bubbles are removed from the liquid, are not suitable for a highly viscous liquid or a liquid which must be maintained at a predetermined temperature.

Accordingly, a need continues to exist for an apparatus and method which substantially eliminates entrained air from a liquid, and does so rapidly, efficiently, and using low power requirements. Such an apparatus and method should be suitable for a highly viscous liquid and a liquid which needs to be maintained at a predetermined temperature, for example a photographic emulsion.

Further, a container holding the liquid should be readily removable and replaceable with another container so as to prevent contamination of the liquids and allow the container to be utilized in further testing.

SUMMARY OF THE INVENTION

An object of the invention is to provide an apparatus and method which substantially eliminates entrained air from a liquid.

Another object of the invention is to provide such an apparatus and method which is able to eliminate the entrained air rapidly, efficiently, and using low power requirements.

Still another object of the invention is to provide such an apparatus and method which is suitable for a highly viscous liquid and liquid which needs to be maintained at a predetermined temperature.

Yet another object of the invention is to provide such an apparatus and method wherein a container holding the liquid can be readily removed and replaced with another container.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided an apparatus for reducing bubbles in a discrete sample of a temperature sensitive liquid, particularly a photographic emulsion. The apparatus includes a container having a bottom and side walls with a sample area adapted to contain the liquid.

The container is made of a substantially acoustically transparent material which provides efficient coupling of ultrasonic energy and the liquid. The apparatus also includes means for removably mounting the container such that the bottom and at least a portion of the side walls are immersed in a fluid bath. Means are provided for heating the fluid bath to maintain the liquid at a predetermined temperature greater than ambient temperature. Spaced from the container is an ultrasonic means which generates ultrasonic waves. These ultrasonic waves are directed through the fluid toward the bottom of the container to substantially eliminate air bubbles in the liquid.

According to another aspect of the invention, there is provided a method of reducing bubbles in a temperature sensitive liquid, particularly a photographic emulsion. The method includes placing a discrete sample of the liquid in a container having a bottom and side walls defining a sample area adapted to contain the liquid; the bottom and the side walls being comprised of a substantially acoustically transparent material. The container is removably mounted such that the bottom and at least a portion of the side walls are immersed in a fluid bath. The fluid bath is heated so as to maintain the liquid at a predetermined temperature greater than ambient temperature. Ultrasonic waves are generated and projected through the fluid directly toward the bottom of the container, whereby the entrained air is substantially eliminated.

Accordingly, there is provided an apparatus and method which substantially eliminates entrained air from a liquid, and does so rapidly, efficiently, and using low power requirements. The apparatus and method is suitable for a liquid which needs to be maintained at a predetermined temperature, for example, a photographic emulsion. The apparatus and method provides gentle debubbling of the liquid so as to not adversely affect the characteristics of the liquid. Further, the container holding the liquid can be readily removed and replaced with another container so as to prevent contamination of the liquids and allow the container to be utilized in further testing.

BRIEF DESCRIPTION OF THE DRAWING

The foregoing and other objects, features, and advantages of the invention will be apparent from the following more particular description of the preferred embodiments of the invention, as illustrated in the accompanying drawing.

DETAILED DESCRIPTION OF THE INVENTION

Figure 1:
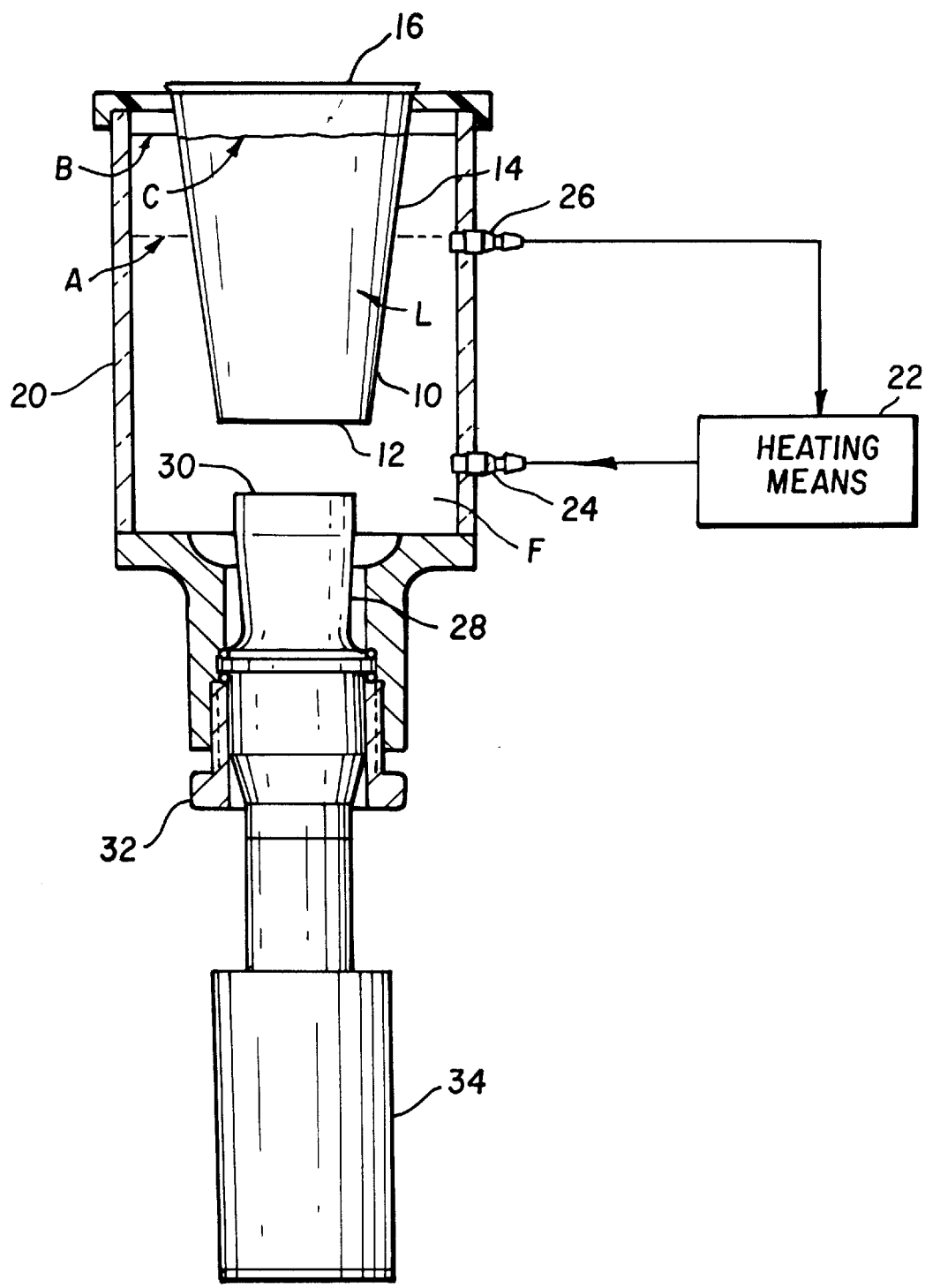
FIG. 1 shows a side view of an apparatus in accordance with the present invention.

The following is a detailed description of the preferred embodiments of the invention, reference being made to the drawing.

FIG. 1 illustrates an apparatus for reducing bubbles in a liquid in accordance with the present invention. An amount of liquid L is disposed in a container 10 having a bottom wall 12, side walls 14, and an opening 16 by which to provide liquid L to container 10. The bottom wall and side walls define a sample area for containing liquid L. Container 10 may optionally include a cover (not shown) which mates with opening 16 to enclose the container.

The apparatus further includes a receptacle 20 configured to receive and retain a fluid F, for example water. Container 10 is removably mounted to receptacle 20 such that bottom wall 12 and at least a portion of side walls 14 are immersed in fluid F. As such, fluid F provides a fluid bath for container 10, and container 10 can be readily removed from receptacle 20 and replaced with another container, thereby preventing cross-contamination of liquids and allowing the container to be used in subsequent analytical analyses. The amount of fluid F may vary within receptacle 20. In addition, the fluid level will vary dependent on whether container 10 is mounted within receptacle 20, displacing the fluid within the receptacle. As illustrated in FIG. 1, Line A shows an example of the level of fluid F which may be present when container 10 is not mounted within receptacle 20, while Line B shows an example of the fluid level when container 10 is mounted within receptacle 20. Preferably, the level of liquid L (Line C) within container 10 is approximately equal to the fluid level when container 10 is mounted within receptacle 20 (e.g., Line B), allowing liquid L to be immersed within the fluid bath. Receptacle 20 may be comprised of a transparent material, such as glass, to allow a user to readily view the fluid level.

Heating means 22 are provided to heat fluid F to a temperature above ambient, thereby controlling and maintaining the temperature of liquid L disposed in container 10 immersed in the fluid bath. As such, liquid L is typically a liquid which is temperature sensitive liquid; that is, a change in temperature may affect the characteristics of the liquid. Inlet 24 and outlet 26 allow fluid F to be circulated from receptacle 20 to heating means 22 and back to receptacle 20. Other methods of providing heat to fluid F will be known to those skilled in the art, for example, an electric heating element may be mounted to receptacle 20.

An ultrasonic horn 28 is mounted to receptacle 20 with an end 30 of ultrasonic horn 28 being in communication with fluid F. End 30 is mounted so as to be directed toward bottom 12 of container 10, with end 30 being spaced from container 10, preferably spaced in the range between about 0.25 to 1.0 inches. In a preferred embodiment, bottom 12 has a dimension and which is substantially equal to a dimension of end 30. As illustrated in FIG. 1, the planar surface of end 30 is parallel with the planar surface of bottom 12 of container 10, with each of end 30 and bottom 12 having a diameter of substantially similar dimension. In a suitable arrangement, bottom 12 has a diameter of approximately 2.5 inches, and end 30 has a diameter of approximately 2.0 inches.

Mounting means 32 are provided to mechanically associate ultrasonic horn 28 with a converter 34 which controls the operation of horn 28.

In operation, a discrete sample of liquid L is disposed within container 10. Container 10 is removably mounted to receptacle 20 to immerse bottom 12 and at least a portion of side wall 14 within the fluid bath. Heating means 22 controls the temperature of fluid bath F, which in turn, controls and maintains the temperature of liquid L at a predetermined value. Fluid F provides a coupling between end 30 and liquid L. Converter 34 directs ultrasonic horn 28 to create an ultrasonic wave directed at bottom 12, the wave propagating through the coupling and container 10 to liquid L, thereby vibrating the liquid and degassing the liquid. By positioning ultrasonic horn 28 in a vertical orientation relative to bottom 12 and opening 16, radiation forces and buoyant forces are employed to encourage debubbling of the liquid, thereby reducing the time required to debubble the liquid. That is, as the acoustic radiation force and the buoyant force act to drive the air bubbles away from end 30 toward the surface of the liquid located at opening 16, liquid L becomes bubble free.

The material comprising container 10 is selected so as to be substantially acoustically transparent. By such a selection, the acoustic impedance of the material is substantially similar to that of the fluid, allowing the ultrasonic wave to propagate essentially unimpeded through the material and into the liquid. While a 90% transmission may be suitable, it is preferred that the transmission be at least 95%, preferably 99%.

The transmission of ultrasonic waves through a material can be calculated from the following equation:

$$T_e = \frac{1}{1 + \left(\frac{m^2 - 1}{2m}\right)^2 \sin^2(kd)}$$

where:
 $T_e$ is a transmission coefficient;
 m is a ratio of the acoustic impedance of the fluid and the material;
 k is a wave number; and
 d is a thickness of the material.

Accordingly, the acoustic impedance is a function of the material. If fluid F is water, a material having suitable transmission characteristics for the present invention are plastics. Therefore, the material comprising container 10 is preferably a plastic, for example, polystyrene, polyethylene, or polypropylene. Other materials may be suitable, such as teflon and acrylic.

It can be noted from the above equation that transmission of ultrasonic waves increases as the material thickness decreases. Therefore, container 10 is preferably comprised of a thin walled plastic material having a wall thickness in the range of between about 0.010 inches and about 0.100 inches.

The thin wall thickness provides for increased power transfer of the ultrasonic waves into the liquid. Thus, converter 34 may operate at a lower power level. This lower power level reduces the occurrence of cavitation on the surface of the ultrasonic horn, the occurrence of which could reduce the debubbling efficiency. An applied power of less than 100 watts has been found suitable.

In measuring the density of a discrete sample of liquid, entrained air in the liquid, such as air bubbles, may result in an inaccurate reading. Therefore, the entrained air is preferably removed from the liquid so that accurate, consistent readings may be obtained. In a preferred embodiment of the invention, the apparatus of the present invention is provided to remove bubbles in a photographic emulsion to allow an accurate density measurement to be made. Since the density measurement may be inaccurate if entrained air is present in the emulsion, the emulsion is degassed before the density measurement is made. Since a density measurement of the emulsion is to be made, only a discrete sample of the emulsion needs to be debubbled. Photographic emulsion is temperature sensitive, and as such, needs to be maintained at a predetermined temperature during the debubbling process, for example, in the about 35–45 degree C. range. The fluid bath therefore provides both a coupling for the degassing and a means of maintaining the emulsion at a predetermined temperature. A suitable container is comprised of polyethylene and has an approximate thickness of 0.010 inches, with operation of the ultrasonic horn typically being in the 20 kHz to 40 kHz range. Once the emulsion is debubbled, the container can be removed from the fluid bath and moved to a density-measuring apparatus to allow the density of the emulsion to be measured. The sample of liquid may remain in the container during transport to the density measurement apparatus, thereby allowing the same container to be used throughout the measurement process. This reduces handling of the sample, and eliminates cross contamination. Such a container can be a single-use container (i.e., one time use).

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. An apparatus for reducing bubbles in a discrete sample of a temperature sensitive liquid, comprising:
   a container having a bottom and side walls defining a sample area adapted to contain the liquid, said container being comprised of a substantially acoustically transparent material;
   means for removably mounting said container such that said bottom and at least a portion of said side walls are immersed in a fluid bath;
   means for heating said fluid bath to maintain the liquid at a predetermined temperature greater than ambient temperature; and
   an ultrasonic device generating ultrasonic waves through said fluid directed toward said bottom of said container, said ultrasonic device being spaced from said container.

2. The apparatus according to claim 1 wherein said bottom and said side walls are comprised of a material selected from the group polystyrene, polyethylene, and polypropylene.

3. The apparatus according to claim 1 wherein said bottom and said side walls are comprised of a plastic material having a thickness in the range from about 0.010 to about 0.100 inches.

4. The apparatus according to claim 1 wherein said bottom has a diameter of a first dimension, and said ultrasonic device includes an ultrasonic horn having a first end directed toward said bottom, said first end having a second dimension substantially equal to said first dimension.

5. An apparatus for removing bubbles in a discrete sample of photographic emulsion, comprising:
   a container having a bottom and side walls defining a sample area adapted to contain the emulsion sample, said container being comprised of a substantially acoustically transparent material;
   means for removably mounting said container in a fluid bath such that the emulsion sample within the container is immersed within said fluid bath;
   means for heating said fluid bath to maintain the emulsion sample at a predetermined temperature greater than ambient temperature; and
   an ultrasonic device in communication with said fluid bath generating ultrasonic waves through said fluid, said ultrasonic waves being directed toward said bottom of said container, said ultrasonic device being spaced from said container.

6. The apparatus according to claim 5 wherein said bottom and said side walls are comprised of a material selected from the group polystyrene, polyethylene, and polypropylene.

7. The apparatus according to claim 5 wherein said bottom and said side walls are comprised of a plastic material having a thickness in the range from about 0.010 to about 0.100 inches.

8. The apparatus according to claim 5 wherein said bottom has a diameter of a first dimension, and said ultrasonic device includes an ultrasonic horn having a first end directed toward said bottom, said first end having a second dimension substantially equal to said first dimension.

9. A method of removing bubbles from a temperature sensitive liquid, said method comprising:
   placing a discrete sample of the liquid in a container having a bottom and side walls defining a sample area adapted to contain the liquid, said bottom and said side walls being comprised of a substantially acoustically transparent material;
   removably mounting said container such that said bottom and at least a portion of said side walls are immersed in a fluid bath;
   heating said fluid bath to maintain the liquid at a predetermined temperature greater than ambient temperature;
   generating ultrasonic waves; and
   projecting said ultrasonic waves through said fluid directly toward said bottom of said container.

10. A method of reducing bubbles in a discrete sample of photographic emulsion, said method comprising:
    placing the discrete sample of the emulsion in a container having a bottom and side walls defining a sample area adapted to contain the emulsion, said bottom and said side walls being comprised of a substantially acoustically transparent material;
    removably mounting said container such that said bottom and at least a portion of said side walls are immersed in a fluid bath;
    heating said fluid bath to maintain the emulsion at a predetermined temperature greater than ambient temperature;
    generating ultrasonic waves; and
    projecting said ultrasonic waves through said fluid directly toward said bottom of said container.

11. A method of preparing a discrete sample of photographic emulsion for a density determination, said method comprising:
    placing the discrete sample of the emulsion in a container having a bottom and side walls defining a sample area adapted to contain the emulsion, said bottom and said side walls being comprised of a substantially acoustically transparent material;
    removably mounting said container such that said bottom and at least a portion of said side walls are immersed in a fluid bath;
    heating said fluid bath to maintain the emulsion at a predetermined temperature greater than ambient temperature;
    generating ultrasonic waves; and
    projecting said ultrasonic waves through said fluid directly toward said bottom of said container.

12. The method according to claim 11 further comprising the step of measuring the density of the emulsion after projecting said ultrasonic waves.

* * * * *